Figure 1:
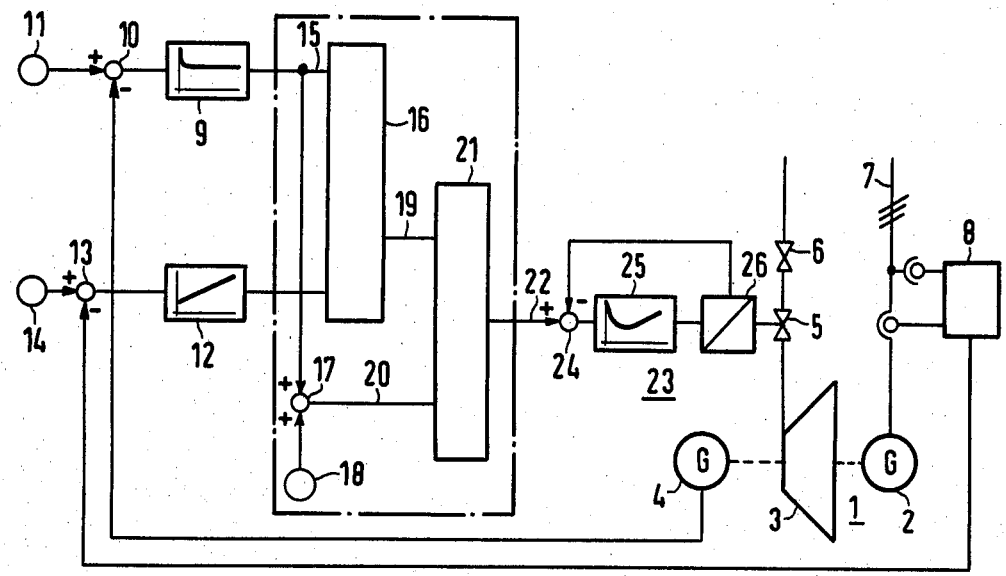

United States Patent [19]

Diegel et al.

[11] 4,292,534

[45] Sep. 29, 1981

[54] POWER AND SPEED CONTROL DEVICE FOR A TURBO-GENERATOR SET

[75] Inventors: Dieter Diegel, Röttenbach; Heinz-Alfred Borgmann, Mülheim, both of Fed. Rep. of Germany

[73] Assignee: Kraftwerk Union AG, Mulheim an der Ruhr, Fed. Rep. of Germany

[21] Appl. No.: 113,118

[22] Filed: Jan. 17, 1980

[30] Foreign Application Priority Data

Jan. 26, 1979 [DE] Fed. Rep. of Germany ....... 2903039

[51] Int. Cl.³ ............................................. F01B 25/06
[52] U.S. Cl. .................................... 290/40 R; 60/663
[58] Field of Search .................... 290/40, 40 A, 40 B, 290/40 C; 60/664, 665, 663, 667; 318/610; 415/17

[56] References Cited

U.S. PATENT DOCUMENTS

| 3,601,617 | 8/1970 | De Mello et al. | 290/40 C |
| 4,120,159 | 10/1978 | Matsumoto et al. | 60/667 |
| 4,146,270 | 3/1979 | Nurnberger et al. | 290/40 R |

Primary Examiner—J. V. Truhe
Assistant Examiner—Donald L. Rebsch
Attorney, Agent, or Firm—Herbert L. Lerner; Laurence A. Greenberg

[57] ABSTRACT

The power and speed control device for a turbo-generator set of the invention has a generator, a turbine, and a governing valve with a positioning control input, for regulating steam fed to the turbine. The device includes a turbine speed controller, a turbine power controller, a maximum selection circuit, a minimum selection circuit, a summing stage, and a device for supplying a constant reference value to the input of the summing stage. The controllers are connected to the maximum selection circuit and the speed controller is additionally connected to the summing stage. The summing stage is connected to the minimum selection circuit, the maximum selection circuit is connected to the minimum selection circuit, and the minimum selection circuit is fed to the positioning control input of the governing valve.

1 Claim, 2 Drawing Figures

POWER AND SPEED CONTROL DEVICE FOR A TURBO-GENERATOR SET

The invention relates to a power and speed control device for a turbo-generator set including a generator and a turbine, in which a speed controller and power controller precede a governing valve which precedes the turbine.

If a turbo-generator set of this type is controlled by actuation of the governing valve preceding the turbine, the turbo-generator set must be accelerated to the nominal speed before the generator is synchronized with an electric power network. After being synchronized, the turbo-generator set is to deliver a certain amount of power in normal operation, so that it is necessary to switch from speed control to power control. In the event of a disturbance in the network or a sudden load reduction of the power delivered by the generator due to other reasons, it must be ensured that the turbo-generator set does not assume impermissible speeds. To this end, the control circuit for the governing valve of the turbine must be acted upon by a speed monitoring device.

It is accordingly an object of the invention to provide a power and speed control device for a turbo-generator set which overcomes the hereinafore mentioned disadvantages of the heretofore known devices of this general type, in which the power controller is relieved by the speed controller during start-up as well as in the event of load shedding, without a separate speed monitoring device or additional control action on the speed or power controller.

With the foregoing and other objects in view there is provided, in accordance with the invention, a power and speed control device for a turbo-generator set having a generator, a turbine, and a governing valve with a positioning control input, for regulating steam fed to the turbine, including a turbine speed controller and a turbine power controller each having an output; a maximum selection circuit, a minimum selection circuit and a summing stage each having a first and a second input and an output, and means for supplying a constant reference value to the first input of the summing stage, each of the outputs of the controllers being connected, respectively, to an input of said maximum selection circuit, the output of the speed controller being additionally connected to the second input of the summing stage, the output of the summing stage being connected to the first input of the minimum selection circuit, the output of the maximum selection circuit being connected to the second input of the minimum selection circuit, and the output of the minimum selection circuit being fed to the positioning control input of the governing valve.

Other features which are considered as characteristic for the invention are set forth in the appended claims.

Although the invention is illustrated and described herein as embodied in a power and speed control device for a turbo-generator set, it is nevertheless not intended to be limited to the details shown, since various modifications and structural changes may be made therein without departing from the spirit of the invention and within the scope and range of equivalents of the claims.

Figure 2:
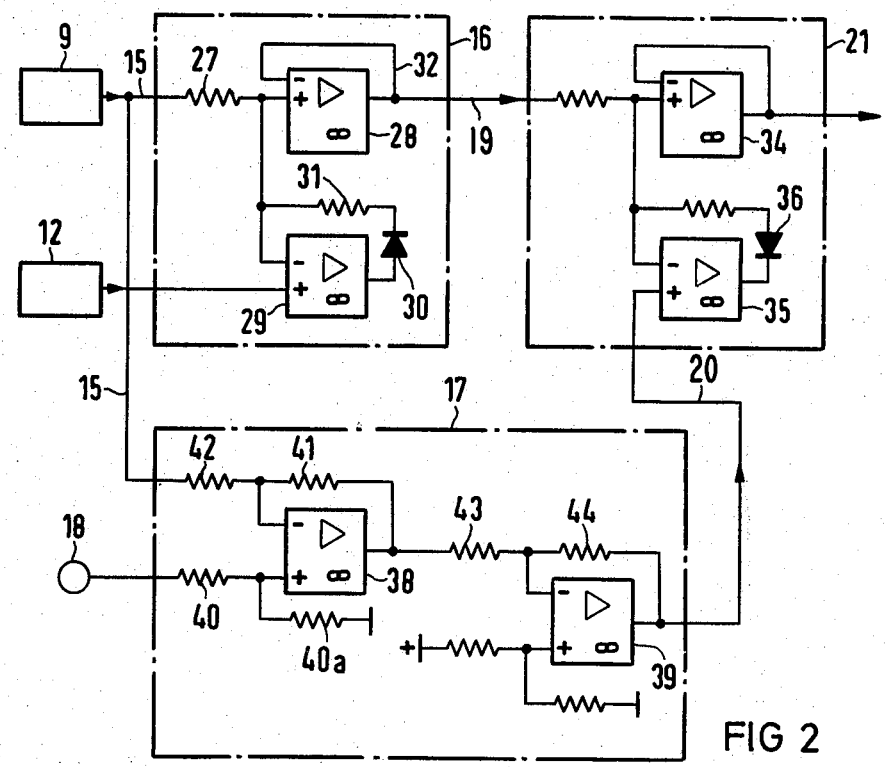

The construction and method of operation of the invention, however, together with additional objects and advantages thereof will be best understood from the following description of specific embodiments when read in connection with the accompanying drawings, in which:

FIG. 1 is a block diagram of an embodiment of the device according to the invention; and FIG. 2 is a circuit diagram of an embodiment of the invention for the maximum-and-minimum selection, using summing amplifiers.

Referring now to the figures of the drawings, and first, particularly to FIG. 1 thereof, there is shown a turbo-generator set 1 substantially comprising a generator 2 and a turbine 3. A tachometer device 4 is connected to the turbine 3, and the turbine 3 is preceded on the steam side by a governing valve 5 and an emergency stop valve 6. The generator 2 is connected to an electric network 7. A power measuring device 8 for the active power delivered by the generator 2, is provided for power measurement.

In FIG. 1 there is also seen a speed controller 9 which is preceded by a summing stage 10 for comparing reference and actual values. Fed into the summing stage 10 are a reference-speed value 11 set with a positive sign, and the output of the tachometer device 4 as the actual-speed value set with a negative sign. Similarly, a power controller 12 is preceded by a summing stage 13 for comparing reference- and actual values. Fed into the summing stage 13 are a power reference value 14 with a positive sign and the output of the power measuring device 8 with a negative sign, for adding the actual-power value. The output 15 of the speed controller 9 is connected to an input of the maximum-selection circuit 16. The output 15 is additionally fed to a summing stage 17 which is in turn preceded by a reference value 18 with positive potential. This reference value 18 is advantageously set so that with an output potential "zero" of the speed controller 9, the governing valve 5 preceding the turbine 3 occupies the maximally opening position provided.

The output 19 of the maximum-selection circuit 16 and the output 20 of the summing stage 17 are connected to the inputs of the minimum-selection circuit 21. The output 22 of the circuit 21 is connected to a positioning control 23 for controlling the governing valve 5. The positioning control 23 includes a summing stage 24 for comparing reference and actual values of a control module 25 and an electric-hydraulic converter 26 which acts on the governing valve 5.

As an embodiment example for the construction of the maximum selection circuit 16 and the minimum-selection circuit 21, FIG. 2 shows that the output 15 of the speed controller 9 is connected through a resistor 27 to the + input of an amplifier 28 and to the − input of an amplifier 29. The amplifiers used here each have a + and a − input, so that a positive potential appears at the output if the potential at the + input predominates, and that a negative potential is present at the output if the potential at the − input predominates. The output of the amplifier 29 is fed back to the − input of the amplifier 29 through a diode 30 and a resistor 31. The output of the amplifier 28 is further fed back to the − input of the amplifier 28 over a line 32.

If the output signal from the power controller 12 is larger than that from the speed controller 9, the diode 30 conducts and the output signal amplified in the amplifier 29 acts on the input of the amplifier 28. Thus, a signal which corresponds to the output of the power controller 12 is present at the output of the amplifier 28 which is connected to the output line 19 of the maximum-selection circuit 16.

If the speed controller 9 delivers a larger signal, the diode 30 is cut off, because the − input of the amplifier 29 controls the output thereof, and the potential on the output line 33 corresponds to the output of the speed controller 9. No selection of the maximum value therefore takes place. The minimum-selection circuit 21 with the amplifiers 34 and 35 and the diode 36 is constructed similarly. The polarity of the diode 36 is the reverse of that of the diode 30 in the maximum selection circuit 16, so that the output of the amplifier 35 acts on the input of the amplifier 34 only if the input potential at the + input of this amplifier is smaller than the input potential at the + input of the amplifier 34 which is connected to the output line 19 of the maximum-selection circuit. The + input of the amplifier 35 is connected to an output line 20 of the summing stage 17.

The summing stage 17 also comprises two amplifiers 38 and 39. The + input of the amplifier 38 is connected through a resistor 40 to a positive potential representing the reference value 18. Another resistor 40a is connected between the + input of the amplifier 38 and ground so that a definite constant potential is present at the + input of the amplifier 38. The output of the amplifier 38 is fed back to its − input through a resistor 41. In addition the output line 15 of the speed controller 9 is connected through a resistor 42 to the − input of the amplifier 38 as well.

If the output value of the speed controller 9 is positive (reference speed is higher than the actual speed), the potential at the output of the amplifier 38 is therefore reduced. This output is connected to the − input of the amplifier 39 through a resistor 43. The + input of the amplifier 39 is connected, similarly to the + input of the amplifier 38, to a fixed potential (0 volts) and the amplifier 39 is furthermore fed back through a resistor 44. The output of the amplifier 39 is connected to the output line 37 of the summing stage 17. As the output value at the amplifier 38 becomes smaller, the value at the − input of the amplifier 39 is therefore reduced, and the potential of the output line 37 is increased thereby. The amplifier 39 thus acts as an inverter so that the total value on the output line 20 corresponds to the sum of the potentials of the two input lines of the adding stage 17.

The operation of the overall circuit according to FIG. 1 is therefore as follows:

For accelerating the turbo-generator set 1 to the nominal speed, the power reference value 14 is set to zero and the speed reference value 11 is slowly increased. Thereby, the speed controller 9 delivers a larger signal than the power controller 12, so that a potential corresponding to the difference between the reference and the actual value of the speed is present at the output 19 of the maximum selection circuit 16. This potential is smaller than the potential at the output 20 of the summing stage 17, since the reference value 18 has a value corresponding to the maximum opening position of the governing valve 5. As a result, the position of the governing valve 5 is determined by the speed controller 9 and the valve is opened until the nominal speed is reached and the speed reference value is not further increased.

If the nominal speed of the turbo-generator set 1 is reached and the generator 2 has been synchronized with the network 7, the speed reference value is kept constant and the power reference value 14 is increased. As soon as the output of the power controller 12 becomes larger than the output of the speed controller 9, the power controller 12 determines the position of the valve 5.

As long as the generator 2 is coupled to the network, the deviation between the reference and the actual speed is negligible. If the potential at the output 19 becomes larger than the potential at the output 20 of the adding stage 17, the reference value 18 determines the opening position of the governing valve 5, so that a further power increase by the power controller 12 is no longer possible.

However, as soon as the generator cannot deliver any, or only a small amount of power, for instance due to a network disturbance in the electrical network 7, the turbine 3 is accelerated and the actual value of the speed exceeds the speed reference value 11. This results in a negative value at the output of the speed controller 9, which reduces the potential at the output 20 of the summing stage 17, so that the governing valve 5 is moved in the closing direction without disconnecting the power controller 12 through the minimum-selection circuit 21. For instance, with a regulation of the speed controller of 5%, the governing valve 5 is closed at an overspeed of 5%, so that it is impossible for the turbo-generator set 1 to reach an impermissible overspeed.

There is claimed:

1. Power and speed control device for a turbo-generator set having a generator, a turbine, and a governing valve with a positioning control input, for regulating steam fed to the turbine, comprising a turbine speed controller and a turbine power controller each having an output; a maximum selection circuit, a minimum selection circuit and a summing stage each having a first and a second input and an output, and means for supplying a constant reference value to said first input of said summing stage, each of said outputs of said controllers being connected, respectively, to an input of said maximum selection circuit for switching between speed and power control, said output of said speed controller being additionally connected to said second input of said summing stage, said output of said summing stage being connected to said first input of said minimum selection circuit, said output of said maximum selection circuit being connected to said second input of said minimum selection circuit, and said output of said minimum selection circuit being fed to the positioning control input of the governing valve.

* * * * *